(12) United States Patent
Verbowski

(10) Patent No.: US 8,424,855 B1
(45) Date of Patent: Apr. 23, 2013

(54) AUTOMOTIVE CONTROL ARM BUSHING HAVING LINEAR MOBILITY

(76) Inventor: Larry Verbowski, Bay City, MI (US)

( * ) Notice: Subject to any disclaimer, the term of this patent is extended or adjusted under 35 U.S.C. 154(b) by 471 days.

(21) Appl. No.: 12/590,644

(22) Filed: Nov. 12, 2009

(51) Int. Cl.
*F16F 7/00* (2006.01)
(52) U.S. Cl.
USPC .......... 267/141.7; 267/140.12; 267/293; 280/124.134
(58) Field of Classification Search .......... 267/140.12, 267/141, 141.2, 141.3, 141.7, 151, 152, 153, 267/292, 293; 280/124.134, 124.177; 384/145, 384/220, 222
See application file for complete search history.

(56) References Cited

U.S. PATENT DOCUMENTS

| | | | | |
|---|---|---|---|---|
| 3,951,477 A | * | 4/1976 | Townshend | 248/141 |
| 5,413,374 A | * | 5/1995 | Pierce | 267/141.2 |
| 6,065,742 A | * | 5/2000 | Whiteford | 267/141.5 |

* cited by examiner

*Primary Examiner* — Thomas J Williams
(74) *Attorney, Agent, or Firm* — Robert L. McKellar; McKellar IP Law, PLLC

(57) ABSTRACT

An automotive control arm bushing. The bushing comprises an elastomeric center portion and two joinable separable locking sleeves, said elastomeric center portion being radially relieved with a portion of the radius being convex segments and a portion of the radius being concave segments, wherein the ratio of convex surface to concave surface is 35:65 to 65:35. In addition, there is an automotive control arm bushing having no linear mobility and a method of replacing an automotive control arm bushing.

10 Claims, 4 Drawing Sheets

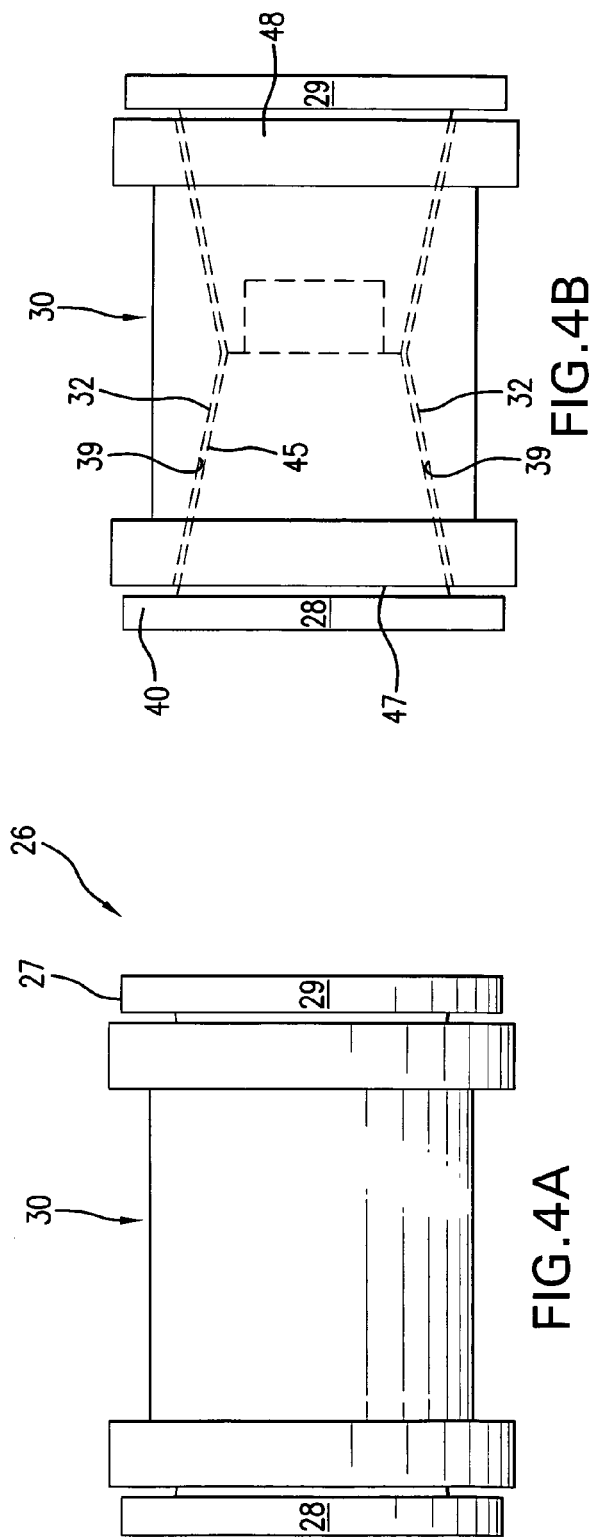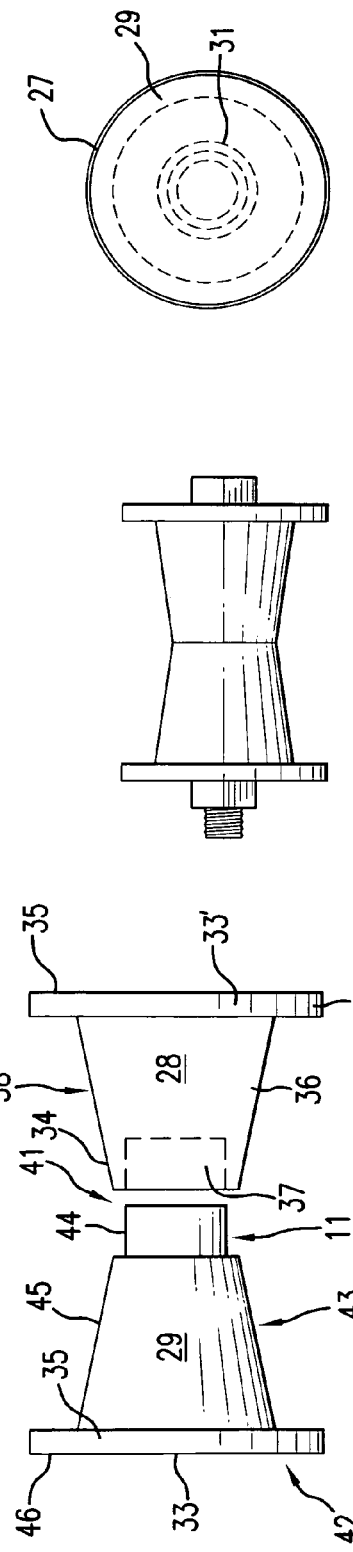

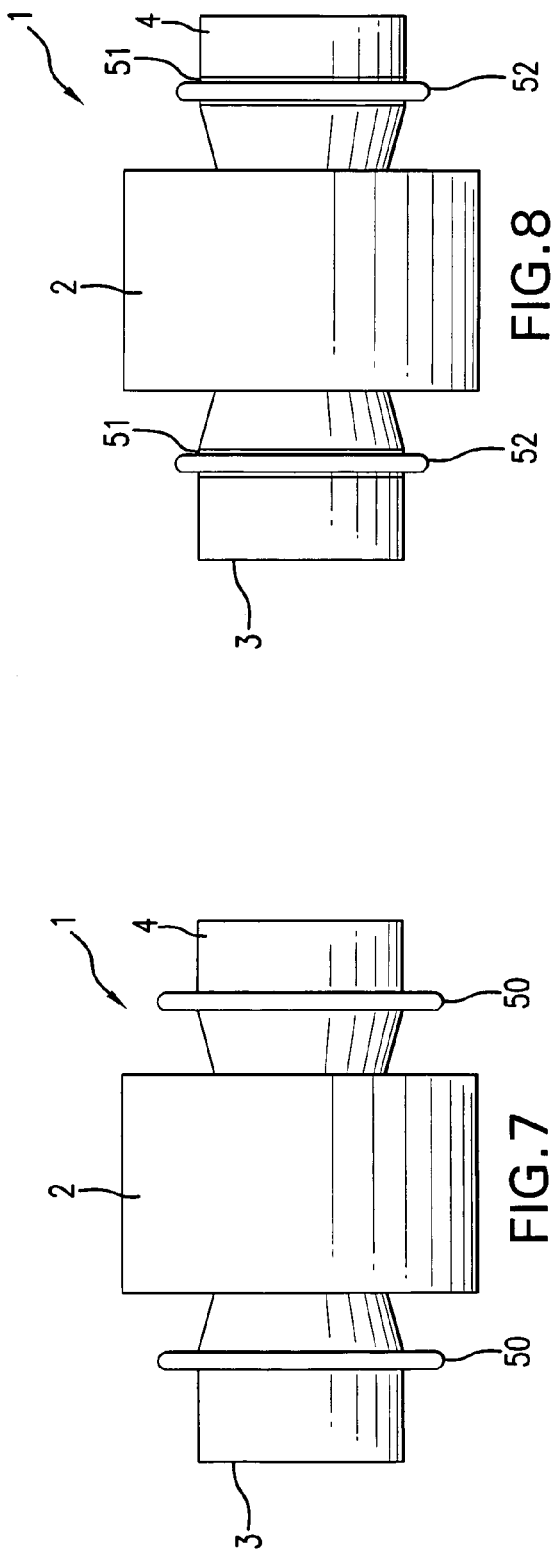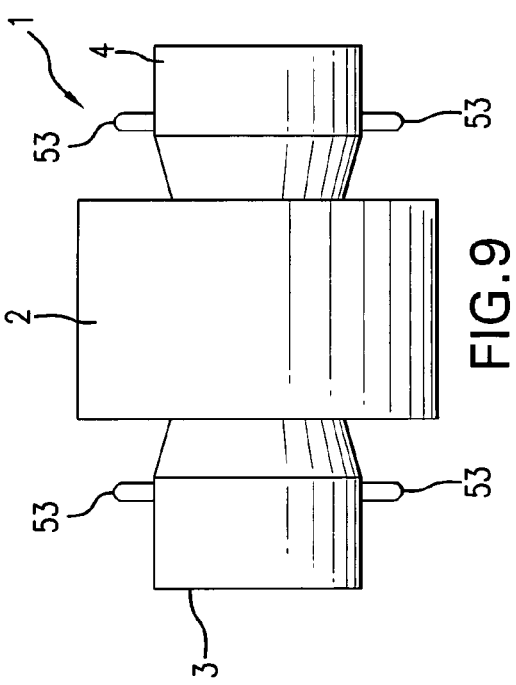

AUTOMOTIVE CONTROL ARM BUSHING HAVING LINEAR MOBILITY

This invention deals with an automotive control arm bushing having linear mobility, and an automotive control arm bushing having no linear mobility as well as a method of replacing worn bushings with the inventive bushings.

BACKGROUND OF THE INVENTION

Bushings in the prior art usually comprise two rubber bushings which are inserted into opposite ends of the bore of the outer member and are pressed towards one another by press members, which are usually pressure plates that engage the outer end faces and are carried by the inner member.

In these kind of bushings, it is usual, in order to increase the resistance offered by the bushing to relative axial movement (linear movement) between the inner and outer members, to provide molded outwardly extending radial flanges on the ends of the rubber bushings which in the assembled bushing extends and lies between an annular end face surrounding the end of the bore of the outer member, and the opposed face of a pressure plate secured to the inner member.

Other like bushings have been proposed in which the rubber bushing is initially of the same length as the inner member, and thus forms flanges by providing a thrust plate or washer on each inner member capable of sliding over its end portion, which projects beyond the bore of the outer member. This thrust member or plate is caused to act on the exposed end face of the rubber bushing so as to shorten the bushing and thus, to cause the part thereof which remains beyond the bore of the outer member to bulge somewhat radially to form a shallow flange.

THE INVENTION

Thus, what is disclosed and claimed herein in one embodiment is an automotive control arm bushing having linear mobility. The bushing comprises an elastomeric center portion and two joinable separable locking sleeves, said elastomeric center portion being radially relieved with a portion of the radius being convex segments and a portion of the radius being concave segments, wherein the ratio of convex surface to concave surface is 35:65 to 65:35.

The elastomeric center portion has a centered opening wherein the centered opening is beveled from each side of the center portion such that a middle of the centered opening is smaller in diameter than the openings on each side of the center portion.

The two joinable locking sleeves are comprised of a first sleeve having a near portion, a distal portion, and a middle portion, said near portion having a receiving opening, said middle portion being beveled to interface with the centered opening in one side of the elastomeric center portion, the distal portion having a diameter larger than the centered opening in the elastomeric center portion.

There is a second sleeve having a near portion, a distal portion and a middle portion, said near portion being an insertable tube that inserts in the receiving opening of the first sleeve, the middle portion being beveled to interface with the centered opening in one side of the elastomeric center portion, the distal portion having a diameter larger than the centered opening in the elastomeric center portion.

Each sleeve has an opening through it to accommodate a fastening device to be inserted through it.

In a second embodiment, there is an automotive control arm bushing having no linear mobility, said bushing having a spool-like configuration and having an elastomeric center portion and two joinable separable locking sleeves. The elastomeric center portion is radially relieved with a circumferential channel in the majority of the radius.

The elastomeric center portion has a centered opening wherein the centered opening is beveled from each side of the center portion such that a middle of the opening is smaller in diameter than the openings on each side of the center portion.

The two joinable locking sleeves are comprised of a first sleeve having near portion, a distal portion, and a middle portion, said near portion having a receiving opening, said middle portion being beveled to interface with the centered opening in one side of the elastomeric center portion, the distal portion having a diameter larger than the centered opening in the elastomeric center portion, each said distal portion having an outside hub affixed thereto.

There is a second sleeve having a near portion, a distal portion and a middle portion, said near portion being an insertable tube that inserts in the receiving opening of the first sleeve, the middle portion being beveled to interface with the centered opening in one side of the elastomeric center portion, the distal portion having a diameter larger than the centered opening in the elastomeric center portion, said distal portion having an outside hub affixed thereto.

Each sleeve has an opening through it to accommodate a fastening device to be inserted therethrough.

In still another embodiment of this invention there is provided bushings having stop means provided on the outside surface of the sleeves to prevent the elastomeric center portion from riding up on the bevel of the sleeves during excessive torque on the bearings.

In yet another embodiment, there is a method of replacing an automotive control arm bushing having essentially no linear movement, the method comprising removing any extant bushing from the control arm bushing housing.

Thereafter, inserting an automotive bushing as set forth Supra and thereafter, inserting a fastener through the centered opening of the first and second sleeves.

Drawing the fastener tight to force the sleeves together thereby compressing the elastomeric center portion outwardly to engage an inner wall of the control arm bushing housing.

Finally, there is an embodiment that is a method of replacing an automotive control arm bushing having linear movement, the method comprising removing any extant bushing from the control arm bushing housing.

Thereafter inserting an automotive bushing as claimed in as set forth Supra and inserting a fastener through the opening of the first and second sleeves.

Drawing the fastener tight to force the sleeves together thereby compressing the elastomeric center portion outwardly to engage an inner wall of the control arm bushing housing.

BRIEF DESCRIPTION OF THE DRAWINGS

FIG. 4A is a full side view of a non-linear movement bushing of this invention.

FIG. 4B is a full side view of a non-linear movement bushing of this invention.

FIG. 5A is a full side view of the two sleeves of the bushing of FIG. 4A, disengaged.

FIG. 5B is a full side of the two sleeves of the bushing of FIG. 4A, engaged.

FIG. 6 is a full end view of the bushing of FIG. 4A.

FIG. 7 is a full side view of a bushing of this invention provided with stops.

FIG. 8 is a full side view of a device of this invention wherein the stops are channel and o-rings FIG. 9 is a full side view of a device of this invention wherein the stops are tabs.

DETAILED DESCRIPTION OF THE INVENTION AND THE DRAWINGS

Figure 1:
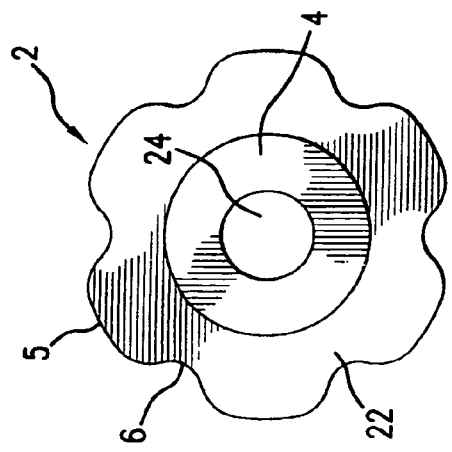
FIG. 1 is full side view of a linear movement bushing of this invention.
Figure 2:
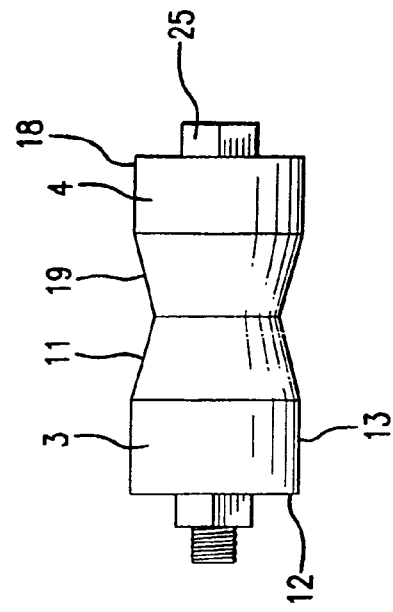
FIG. 2 is a full end view of a linear movement bushing of this invention.
Figure 3A:
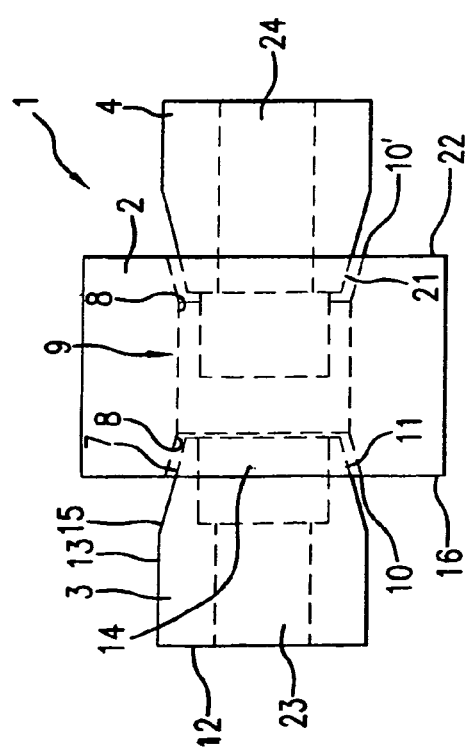
FIG. 3A is a full side view of the two sleeves of FIG. 1, disengaged.

FIG. 1 is a full side view of a linear movement bushing 1 of this invention wherein there is shown an elastomeric center portion 2 (also FIG. 2) and two joinable separable locking sleeves, 3 and 4. The joinable sleeves 3 and 4 are shown in FIG. 3A as being disengaged and the receiving opening 14 is shown in phantom. The elastomeric center portion 2 is radially relieved, that is the outside surface of the elastomeric center portion 2 has a portion of it as convex segments 5 and a portion of it as concave segments 6. The ratio of the convex surface to the concave surface is 35:65 to 65:35.

The elastomeric center portion 2 has a centered opening 7 all the way through the center thereof. The centered opening 7 is beveled 8 from each side of the center portion 2 such that a middle 9 of the centered opening 2 is smaller in diameter than the openings 10 and 10' on each side of the center portion 2.

The joinable locking sleeve 3 has a near portion 11, a distal portion 12 and a middle portion 13. The near portion 11 has a receiving opening 14. The near portion 13 has a beveled surface 15 that interfaces with the beveled surface 8 of the centered opening 7 on one side 16 of the elastomeric center portion 2. The distal portion 12 has a diameter larger than the centered opening 7 in the elastomeric center portion 2.

The second sleeve 4 has a near portion 17, a distal portion 18 and a middle portion 19. The near portion 17 is an insertable tube 20 that inserts in the receiving opening 14 of the first sleeve 3.

The middle portion 19 is beveled 21 to interface with the beveled surface 8 of the centered opening 7 in the opposite one side 22 of the elastomeric center portion 2. The distal portion 19 has a diameter larger than the centered opening 7 in the elastomeric center portion 2.

Figure 3B:
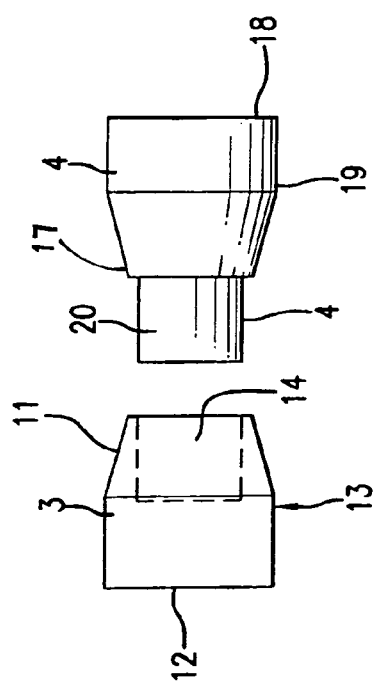
FIG. 3B is a full side view of the two sleeves of FIG. 1, fully engaged.

Each of the sleeves 3 and 4 have a openings 23 and 24, respectively, to accommodate a fastening device 25 (FIG. 3B) inserted therethrough.

In use, the sleeves 3 and 4 are inserted into the centered opening of the elastomeric center 2 and the insertable tube 20 is inserted into the receiving opening 14 and the two sleeves 3 and 4 are pushed together enough to engage them with each other. The entire assembly is then inserted into the bushing housing of an automotive control arm. The fastening means is then inserted through the openings in the sleeves and the fastening means is tightened. This causes the elastomeric center 2 to expand radially, the concave segments receiving the expansion of the convex segments such that the convex segments interface snugly with the interior surface of the bushing housing and retain the bushing therein frictionally. In spite of the frictional hold of this bushing in the housing, there is a limited amount of linear movement (through the bushing housing) of the bushing as it has no metal stops or other means of preventing such linear movement.

Figure 11:
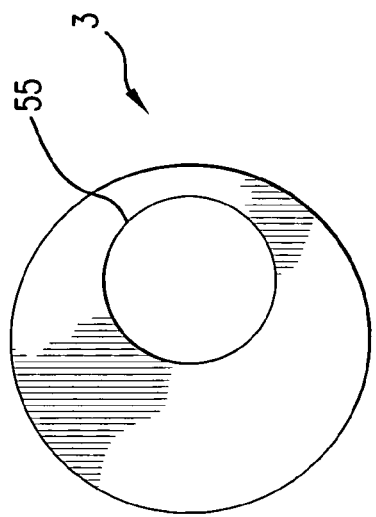
FIG. 11 is an full end view of a sleeve of this invention showing an off-centered opening.

It should be noted that the openings in the sleeves 3 and 4 can be centered or they can be off-center as shown in FIG. 11 at 55. In position, upon loosening the fastener 25, one can turn the sleeve 3 by using a wrench on the flat surface 56, and can thereby adjust the device in the control arm of the automobile.

Figure 10B:
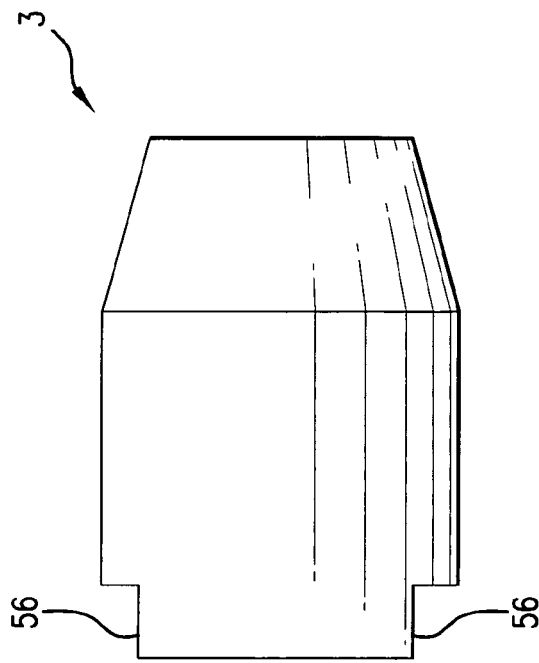
FIG. 10 is a full end view of a sleeve of this invention showing means for allowing a wrench to turn the sleeve.
Figure 10A:
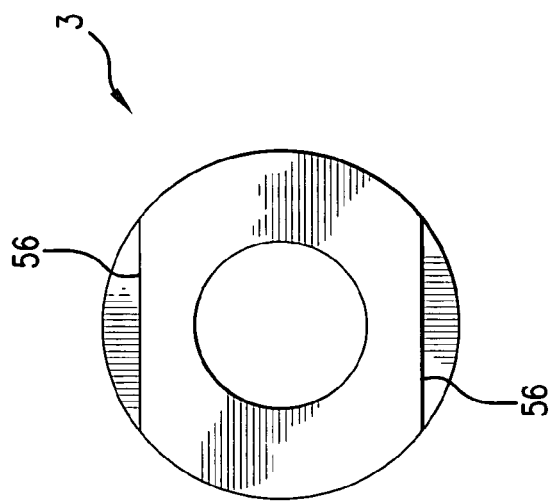

It should be noted that contemplated within the scope of this invention is a sleeve 3 or 4 (sleeve 3 shown in FIGS. 10A and 10B) that is capable of being turned with a wrench by providing a flat surface 56 on the end of the sleeve as shown in FIGS. 10A and 10B.

Turning now to FIG. 4A which is a full side view of a non-linear movement bushing of this invention.

As opposed to the bushing described just infra, which does have limited linear movement in the bushing housing, the bushing of FIG. 4 does not have linear movement.

The bushing 26 of FIG. 4 has a spool-like configuration and is comprised of an elastomeric center portion 27 and two joinable separable locking sleeves 28 and 29. The elastomeric center portion 27 is radially relieved with a circumferential channel 30 in a majority of the radius, that is, more than 50% and less than 90% of the circumference is channel 30. The channel 30 can be a v-shaped channel or it can have a flat surface.

The elastomeric center portion 27 has a centered opening 31 and is beveled 32 on the surface of the centered opening 31. The bevel 32 is such that middle of the centered opening 31 is smaller than the outside ends 33 and 33'.

The sleeve 28 is comprised of a near portion 34, a distal portion 35, and a middle portion 36. The near portion 34 has a receiving opening 37 and the middle portion 36 is beveled 38 to interface with the interior surface 39 of the opening 31. The distal portion 35 has a diameter larger than the opening 31 in the elastomeric center portion 27. The distal portion 35 of the sleeve 28 has a hub 40 formed on the end thereof, said hub 40 being at least equal in diameter to the diameter of the elastomeric center portion 27.

There is a second sleeve 29 having a near portion 41, a distal portion 42, and a middle portion 43. The near portion 41 consists of an insertable tube 44 that inserts into the receiving opening 37 of the first sleeve 28. The middle portion 43 is beveled 45 to interface with the interior surface 39 of the elastomeric center portion 27. The distal portion 42 has a diameter larger than the opening 31 in the elastomeric center portion 27.

The distal portion 42 has an outside hub 46 affixed thereto, which hub 46 is at least equal in diameter to the diameter of the elastomeric center portion 27.

Each of the sleeves 28 and 29 have a openings 47 and 48, respectively, to accommodate a fastening device 49 (FIG. 5B) inserted therethrough.

In use, the sleeves 28 and 29 are inserted into the centered opening of the elastomeric center portion 27 and the insertable tube 44 is inserted into the receiving opening 37 and the two sleeves 28 and 29 are pushed together enough to engage them with each other. The entire assembly is then inserted into the bushing housing of an automotive control arm. The fastening means is then inserted through the openings in the sleeves and the fastening means is tightened. This causes the elastomeric center portion 27 to expand radially. The hubs 40 and 46. prevent the bushing from moving linearly in the bushing housing.

In a final embodiment, there is a bushing of this invention that is provided with stops to prevent the elastomeric center portion 2 from riding up on the beveled portion of the sleeves during high torque.

Thus, referring to FIG. 7, there is shown a full side view of a bushing 1 of this invention in which the sleeves 3 and 4 are slightly disengaged from each other. There is shown a metal ring 50 that is compressed around the outside surface to provide a stop.

FIG. 8 shows a full side view of a bushing 1 of this invention in which the sleeves 3 and 4 are slightly disengaged from each other. There is shown a groove 51 and a snap ring 52 around the outside surface to provide a stop.

FIG. 9 is a full side view of a bushing 1 of this invention in which the sleeves 3 and 4 are slightly disengaged from each other. There is shown metal tabs 53 around the outside surface to provide stops.

There is a method of replacing an automotive control arm bushing, the method comprising removing any extant bushing from the control arm bushing housing. Thereafter, inserting an automotive bushing as set forth Supra and then inserting a fastener through the opening of the first and second sleeves and drawing them together with a sleeve fastener.

The elastomeric material of this invention can be any elastomeric material that has the toughness to withstand the rigors of use in the bushing.

Preferred for this invention are polyurethane elastomeric materials and most preferred are those polyurethane elastomeric materials that can be molded rather than machined.

What is claimed is:

1. An automotive control arm bushing having linear mobility, comprising an elastomeric center portion having an opening at each end and two joinable separable locking sleeves, said elastomeric center portion being radially relieved with a portion of said radius being convex segments and a portion of said radius being concave segments, wherein the ratio of said convex surface to said concave surface is 35:65 to 65:35;

said elastomeric center portion having a centered opening at each end wherein said centered opening is beveled from each side of said center portion such that a middle of each centered opening is smaller in diameter than said openings at each end of said center portion;

said two joinable locking sleeves comprised of a first sleeve having a near portion, a distal portion, and a middle portion, said near portion having a receiving opening, said near portion being beveled to interface with said centered opening on one side of said elastomeric center portion, said distal portion having a diameter larger than said centered opening in said elastomeric center portion;

a second sleeve having a near portion, a distal portion and a middle portion, said near portion being an insertable tube that inserts in the receiving opening of said first sleeve, said second sleeve middle portion being beveled to interface with said centered opening in one side of said elastomeric center portion, said second sleeve distal portion having a diameter larger than said centered opening in said elastomeric center portion;

each said sleeve having a second opening therethrough in alignment with said receiving opening and said insertable tube to accommodate a fastening device to be inserted therethrough.

2. An automotive control arm bushing as claimed in claim 1 wherein said receiving opening, said insertable tube, and said both second openings are in linear alignment and are centered in said respective sleeves.

3. An automotive control arm bushing as claimed in claim 1 wherein said receiving opening, said insertable tube, and said both second openings are in linear alignment and are off-centered in said respective sleeves.

4. An automotive control arm bushing as claimed in claim 1 wherein, in addition, there are stops provided on the outside surface of said sleeves to prevent said elastomeric center portion from moving upward on said bevel of said sleeves owing to increased torque on a bearing associated therewith.

5. An automotive control arm bushing as claimed in claim 4 wherein said stops are an integral part of said sleeves.

6. An Automotive control arm bushing as claimed in claim 4 wherein said stops are a compressed metal ring around the surface of said sleeves.

7. An automotive control bushing as claimed in claim 4 wherein said stops are individual metal taps that are an integral part of said sleeves.

8. An automotive control arm bushing as claimed in claim 4 wherein said stops are provided by a groove in the outside surface of said sleeves and a snap ring provided in the groove.

9. A method of replacing an automotive control arm bushing, the method comprising:

A. removing any extant bushing from said control arm bushing housing;

B. inserting an automotive bushing as claimed in claim 1;

C. inserting a fastener through said opening of said first and second sleeves;

D. drawing said fastener tight to force said sleeves together thereby compressing said elastomeric center portion outwardly to engage an inner wall of said control arm bushing housing.

10. An automotive control arm bushing as claimed in claim 1 wherein, in addition, there is at least one flat surface on the locking sleeves to accept a wrench thereon.

* * * * *